United States Patent [19]

Watson et al.

[11] Patent Number: 4,670,164

[45] Date of Patent: * Jun. 2, 1987

[54] LIQUID POLYMER CONTAINING COMPOSITIONS FOR THICKENING AQUEOUS SYSTEMS

[75] Inventors: Kenneth E. Watson; Keith W. Sharp, both of Houston, Tex.

[73] Assignee: NL Industries, Inc., New York, N.Y.

[ * ] Notice: The portion of the term of this patent subsequent to Nov. 11, 2003 has been disclaimed.

[21] Appl. No.: 847,946

[22] Filed: Apr. 3, 1986

Related U.S. Application Data

[63] Continuation of Ser. No. 115,405, Jan. 25, 1980, Pat. No. 4,622,153.

[51] Int. Cl.$^4$ .................... C09K 7/02; E21B 43/00
[52] U.S. Cl. ........................ 252/8.511; 252/8.51; 252/8.551; 252/363.5
[58] Field of Search ............ 252/8.5 C, 8.5 P, 8.55 R, 252/363.5, 8.5 A; 536/87, 96; 106/186, 191

[56] References Cited

U.S. PATENT DOCUMENTS

| | | | |
|---|---|---|---|
| 3,122,203 | 2/1964 | Hawkins | 252/8.55 X |
| 3,455,714 | 7/1969 | Bishop et al. | 252/363.5 X |
| 3,475,334 | 10/1969 | Boudreaux | 252/8.55 |
| 3,537,994 | 11/1970 | House | 252/403 X |
| 3,852,201 | 12/1974 | Jackson | 252/8.5 |
| 3,960,736 | 6/1976 | Free et al. | 252/8.5 X |
| 4,105,578 | 8/1978 | Finlayson et al. | 252/315.2 |

FOREIGN PATENT DOCUMENTS 2000799 1/1979 United Kingdom .

*Primary Examiner*—Herbert B. Guynn
*Attorney, Agent, or Firm*—Browning, Bushman, Zamecki & Anderson

[57] ABSTRACT

A liquid polymer containing composition, useful as a thickening agent for aqueous systems, containing hydroxyethyl cellulose, a hydrophobic liquid medium in which the hydroxyethyl cellulose is substantially non-swellable and a gelling agent for thickening the hydrophobic liquid.

6 Claims, 1 Drawing Figure

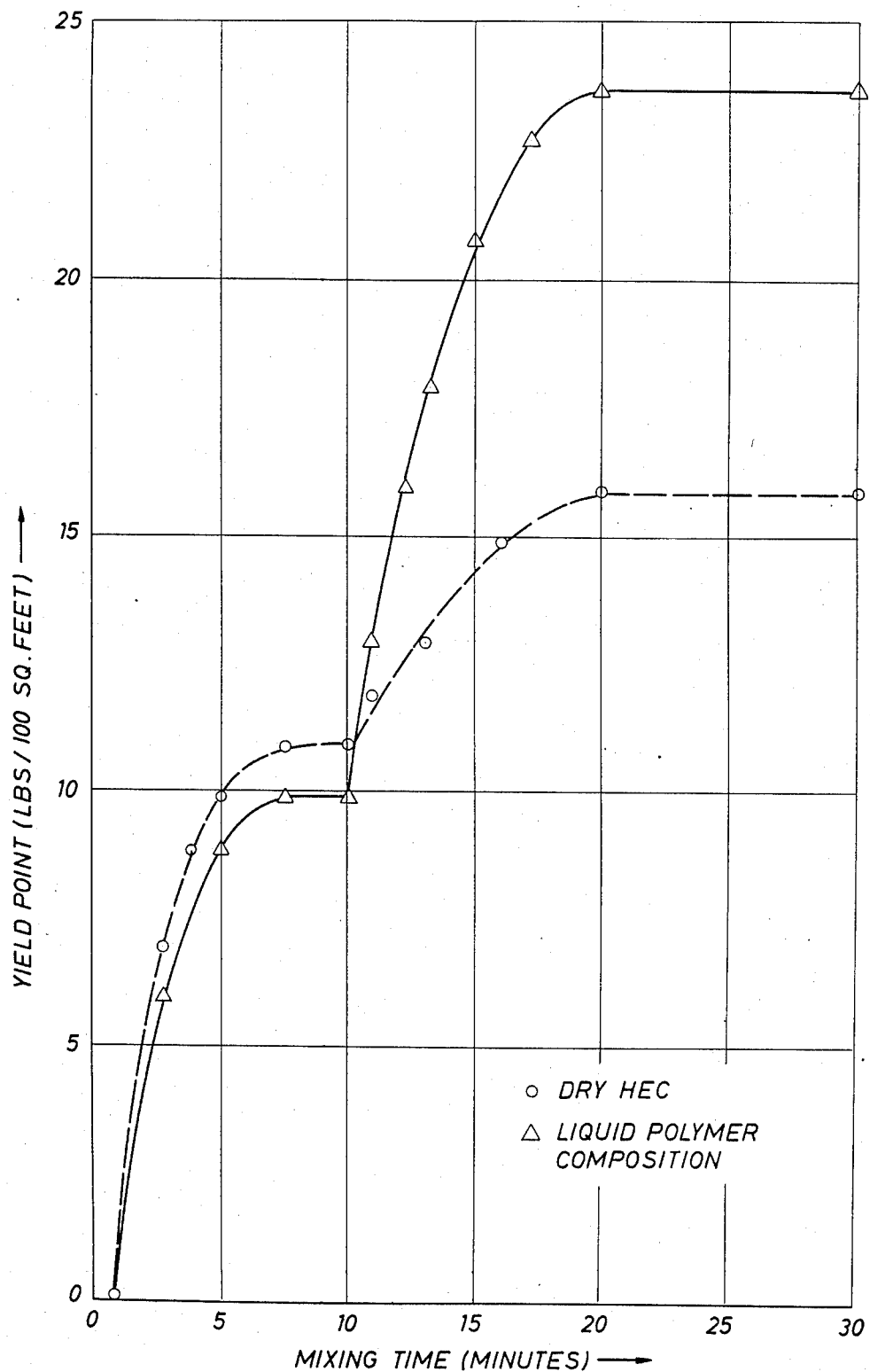

LIQUID POLYMER CONTAINING COMPOSITIONS FOR THICKENING AQUEOUS SYSTEMS

This is a continuation of application Ser. No. 115,405, filed Jan. 25, 1980, now U.S. Pat. No. 4,622,153.

BACKGROUND OF THE INVENTION

The present invention relates to liquid polymer containing compositions for use as thickening agents in aqueous systems, and to the preparation of thickened aqueous well drilling and treating fluids.

Thickened aqueous mediums, particularly those containing oil field brines, are commonly used in well drilling, workover, and completing activities. Such aqueous media are also advantageously employed in hydraulic well treating and subterranean formation treating such as for the enhanced recovery of oil, as packer fluids, spacer fluids and hole abandonment fluids. In many cases, as for example in workover operations, the equipment at the well site is not as sophisticated as that commonly available at a drilling site. This is especially true in the case of equipment used for mixing fluids which are used in the workover operations. It is known to use hydrophilic polymeric materials such as hydroxyethyl cellulose (HEC) as thickening agents for aqueous mediums used in workover operations as well as in drilling, completion and other well treatment activities. However, it has been found that when HEC is added, in dry form, to an oil field brine to form, for example, a workover fluid, the fluid contains unhydrated lumps of polymer known as "fish eyes."

"Fish eyes" not only cause surface problems, such as screen blinding and reduced polymer yield, but also cause a variety of down hole problems. The unhydrated lumps of polymer can cause well damage by plugging perforations or plating out on the formation during open hole operations. Permeability impairment of gravel packs and blocking of screen and liner assemblies can also occur. The damage caused down hole by "fish eyes" is not easily reversed. The lumps of unhydrated HEC are inert in enzymes, chemical breakers and acids.

SUMMARY OF THE INVENTION

It is therefore an object of the present invention to provide a new liquid polymer containing composition useful in the thickening of aqueous media.

A further object of the present invention is to provide an improved aqueous well treating or drilling fluid.

Yet another object of the present invention is to provide a liquid, polymer containing composition which can be easily poured and admixed with oil field brines and the like to form thickened aqueous well drilling and treating fluids.

The above and other objects of the present invention will become apparent from the drawing, the description given herein and the appended claims.

In accordance with the present invention there is provided a liquid, polymer containing composition which can be used for thickening aqueous mediums such as fresh water, oil field brines and the like to provide well drilling and treating fluids. The composition includes hydroxyethyl cellulose (HEC), a hydrophobic liquid and a gelling agent. The hydrophobic liquid is a hydrocarbon in which the HEC is substantialy nonswellable. The gelling agent is one which effects gelation or thickening of the hydrophobic liquid. The composition may contain in addition, with advantage, buffering agents, defoamers and degellants, the latter acting to control the viscosity of the composition. The liquid, polymer containing compositions when admixed with aqueous mediums, particularly oil field brines, provide ideal well drilling or treating fluids such as, for example, workover fluids.

BRIEF DESCRIPTION OF THE DRAWINGS

The single FIGURE shows the effect on ultimate yield point of an aqueous system upon the addition of dry HEC and the compositions of the present invention.

DESCRIPTION OF THE PREFERRED EMBODIMENTS

The novel, liquid polymer containing compositions of the present invention utilize hydroxyethyl cellulose (HEC) as the primary component to effect thickening of the aqueous medium. Hydroxyethyl cellulose is a high yield, water soluble nonionic polymer produced by treating cellulose with sodium hydroxide followed by reaction with ethylene oxide. Each anhydroglucose unit in the cellulose molecule has three reactive hydroxy groups. The average number of moles of ethylene oxide that become attached to each anhydroglucose unit in cellulose is called moles of substituent combined. In general, the greater the degree of substitution, the greater the water solubility. While HEC having a mole substitution level as low as 1.5 can be used, it is preferable to use HEC having a mole substitution level of 1.8 or greater, especially 2.5 and greater. It will be understood that the particular HEC chosen will depend upon the type of liquid polymer composition, and ultimately the type of well drilling or treating fluid, desired. For example, so called surface treated HEC such as described in U.S. Pat. Nos. 3,455,714, 2,879,268 and 3,072,035 can be used with advantage. Such surface treated HEC exhibits greater dispersabilty in the composition. The HEC will be present in the liquid polymer containing composition in amounts from about 25 to about 55% by weight, based on the total liquid, polymer containing composition, and more preferably, from about 30 to about 50% by weight, based on the total liquid, polymer containing composition.

The hydrophobic liquid used in preparing the compositions of the present invention, in general, is any hydrocarbon which does not cause significant swelling or thickening of the HEC. Exemplary hydrophobic liquids include liquid aliphatic and aromatic hydrocarbons, particularly those containing 5 to 10 carbon atoms, diesel oil, kerosene, petroleum distillates, petroleum oils and the like. Generally speaking, the hydrophobic liquid will be non-polar and have a low pour point. The hydrophobic liquid will be present in the composition of the present invention in amounts from about 35 to about 70% by weight, based on the total weight of the composition, and preferably from about 40 to 60% by weight, based on the total weight of the composition.

The liquid, polymer containing compositions of the present invention also contain a gelling agent for effecting gelation or thickening of the hydrophobic liquid. The gelling agent, which can comprise a mixture of materials, is desirably an organophilic clay produced by the reaction of a methyl benzyl dialkyl ammonium compound, wherein the compound contains 20 to 35% alkyl groups having 16 carbon atoms, and 60 to 75% alkyl groups having 18 carbon atoms and a smectite-type clay having a cationic exchange capacity of at least 75 milliequivalents per gram of clay, wherein the amount of the ammonium compound is from about 100 to about 120 milliequivalents/100 grams of the clay, 100% active clay basis, and wherein the alkyl group contains at least 12 carbon atoms and preferably from 14 to 22 carbon atoms. A particularly preferred organophilic clay is methyl benzyl dihydrogenated tallow ammonium bentonite as disclosed in U.S. Pat. No. 4,105,578, incorporated herein by reference. The gelling agent will be present in the composition in amounts of from about 1.5 to about 8% by weight, based on the weight of the hydrophobic liquid, preferably from about 2.5 to about 6% by weight, based on the weight of the hydrophobic liquid.

When utilizing these organophilic clays as the gelling agent, it is desirable to include a dispersant to aid in suspending the organophilic clay in the hydrophobic liquid. Preferred dispersants include liquid, low molecular weight polar organic compounds such as lower alcohols, lower ketones, and the like. Especially, preferred are alcohols having from 1 to 6 carbon atoms, ketones having from 2 to 8 carbon atoms and mixtures thereof. The dispersant can comprise, with advantage, a solution of water and a liquid miscible organic compound such as one of the lower alcohols or ketones noted above. Thus, for example, a mixture of methanol and water containing, by volume, from about 75 to about 98% methanol and from about 25 to about 2% water makes an ideal dispersant. The dispersant will be present in an amount of about 1.5 to about 100% by weight, based on the weight of the organophilic clay, more preferably from about 20 to about 40% by weight, based on the weight of the organophilic clay.

Optionally, the liquid polymer containing compositions of the present invention can contain a degellant to control the viscosity of the composition. Typical degellants include fatty acids, polyalkylene glycols, polyalkylene glycol monofatty esters, polyalkylene glycol difatty esters and mixtures thereof, where the fatty acid group contain from 12 to 18 carbon atoms and the alkylene group contains from 2 to 3 carbon atoms. Exemplary non-limiting fatty acids include dodecanoic acid, hexadodecanoic acid and octadecanoic acid. Exemplary polyalkylene glycols include polyethylene glycol and polypropylene glycol. Exemplary polyalkylene glycol monofatty esters include polypropylene glycol monooleyl ester and polyethylene glycol monopalmitate. Exemplary polyalkylene glycol difatty esters include polyethylene glycol dilaurate, polyethylene glycol dioleate and polypropylene glycol dipalmitate. A particularly desirable degellant, useful in the compositions of the present invention, is a mixture of stearic acid (5% by weight), polyalkylene glycol (10% by weight), polyalkylene glycol monooleyl ester (45% by weight), polyethylene glycol dilaurate (10% by weight), and kerosene solvent (30% by weight). When employed, the degellant will be present in amounts of from about 5 to about 20% by weight, based on the weight of the HEC and, more preferably, from about 7.5 to about 15% by weight, based on the weight of the HEC.

Additionally, the composition may contain a buffering agent to control the pH. The buffer will be one which, when the liquid, polymer containing composition is added to an aqueous system, will provide a pH within the range of about 8.5 to about 11.5. The preferred buffering agent is magnesium oxide although other basic materials such as soda ash, sodium bicarbonate and lime may be used as well. Highly water soluble buffering agents have the advantage of aiding in dispersing the HEC. In addition, other basic materials, which do not deleteriously effect the rheolgical or other properties of the well drilling and treating fluids produced, can be employed as buffering agents. The buffering agent can be present in the composition in amounts of up to about 35% by weight, based on the weight of the HEC present. Preferably, however, the buffering agent will be present in amounts of from about 7.5 to about 20% by weight, based on the weight of the HEC.

In preparing the liquid, polymer containing compositions, it is generally desirable to admix the gelling agent and the hydrophobic liquid followed by addition of the dispersant under suitable mixing conditions until the desired viscosity is achieved. The HEC is then added followed by the addition of the degellant and buffering agent if the latter are employed. The composition is then thoroughly mixed, with shear, until the desired viscosity is achieved.

As noted, the composition of the present invention can be mixed with aqueous systems to provide highly useful well drilling and treating fluids. While the aqueous medium can comprise fresh water, preferably the aqueous medium will be one which contains a soluble salt such as for example a soluble salt of an alkali metal, an alkaline earth metal, a Group IB metal, a Group IIB metal, as well as water soluble salts of ammonia and other anions. In particular, oil field brines containing sodium chloride and/or calcium chloride, when admixed with the compositions herein, make excellent workover fluids. The amount of the water soluble salt dissolved in the aqueous medium will vary depending upon the desired density of the well drilling or treating fluid. However, it is common to employ saturated solutions of sodium chloride and/or calcium chloride in preparing such fluids. In preparing aqueous well drilling and treating fluids using the liquid, polymer containing compositions, the amount of the liquid polymer composition added will vary depending upon the viscosity desired. Desirable well drilling and treating fluids can be made by combining an aqueous medium with sufficient liquid, polymer containing composition such that the final mixture contains from about 0.1 to about 2 pounds per barrel (ppb) of HEC.

To further illustrate the invention, the following non-limiting examples are presented.

EXAMPLE 1

A fluid having the equivalent of 1 ppb of HEC was prepared by adding 9 grams of NATROSOL 250 HHR (Tradename of a dry HEC marketed by Hercules, Incorporated) to 3150 ml of fresh water. To this mixture was added 0.9 grams of BARABUF (Tradename of a magnesium oxide buffering agent marketed by NL Baroid, Houston, Tex.).

After mixing for 10 minutes the mixture had flow properties of plastic viscosity of 9 cp and yield point of 11 lb/100 sq ft and a pH of 10. An additional 4.5 grams of dry HEC was added to the fluid bringing the total HEC content in the mixture to the equivalent of 1.5 ppb. "Fish eyes" (unhydrated lumps of HEC) formed immediately upon sifting the HEC into the thickened water. Mixing was continued for an additional 20 minutes. The fluid was poured through an 8", 45 mesh screen. The "fish eyes" completely covered the screen. The fluid had flow properties of a plastic viscosity of 11 cp and a yield point of 16 lb/100 sq ft.

EXAMPLE 2

A liquid composition in accordance with the present invention was prepared by adding GELTONE II (Tradename of an organophilic clay marketed by NL Baroid, Houston, Tex.), to diesel oil No. 2 and mixing, with shear, for 5 to 10 minutes. A dispersant comprised of a 95/5 (volume/volume) methanol/$H_2O$ solution was added to the mixture followed by the addition of NATROSOL 250 HHR (Tradename of a HEC polymer marketed by Hercules Incorporated). A degellant and BARABUF (Tradename of a magnesium oxide buffering agent marketed by NL Baroid, Houston, Tex.) were then added and the ingredients thoroughly mixed. The degellant is a mixture of 5% stearic acid, 10% polyalkylene glycol, 45% polyalkylene glycol monooleyl ester, 10% polyethylene glycol dilaurate, and 30% kerosene, all percentages by weight of the total composition. The liquid thus prepared had the following composition:

| Component | Weight % |
| --- | --- |
| Diesel No. 2 | 43.4 |
| GELTONE II | 1.30 |
| 95/5 Methanol/ | 0.43 |
| NATROSOL 250 HHR | 45.65 |
| Degallant | 4.57 |
| MAGOX 98 HR | 4.57 |

A fluid having the equivalent of 1 ppb HEC was prepared by adding 19 ml of the liquid HEC polymer composition described above to 3150 ml of fresh water. After 10 minutes of mixing, the fluid had flow properties of plastic viscosity of 9 cp and yield point of 10 lbs/100 sq ft. An additional 9.5 ml of the liquid polymer containing composition were added and mixed for 20 minutes so as to bring the final concentration of HEC to the equivalent of 1.5 ppb. Small liquid HEC droplets could be seen in the fluid but no "fish eyes" were noted. After pouring the fluid through an 8", 45 mesh screen, the fluid was found to have flow properties of plastic viscosity of 14 cp and yield point of 24 lb/100 sq ft. The rheological data versus time of mixing for the fluids of Example 1 and Example 2 are shown in the Table below and graphically depicted in the drawing.

| Mixing Time (min) | Yield Time (lb/100 sq ft) | |
| --- | --- | --- |
| | Liquid Polymer | Dry Polymer |
| Equivalent of 1 ppb of HEC | | |
| 1 | 0 | 0 |
| 3 | 6 | 7 |
| 5 | 9 | 10 |
| 8 | 10 | 11 |
| 10 | 10 | 11 |
| Equivalent of 1.5 ppb of HEC | | |
| 11 | 13 | 12 |
| 12.5 | 16.5 | 13 |
| 15 | 21 | 14.5 |
| 17.5 | 23 | 15.5 |
| 20 | 24 | 16 |
| 25 | 24 | 16 |
| 30 | 24 | 16 |

The drawing dramatically depicts the effect of adding additional HEC to previously viscosified fluids. Note that when dry HEC is added (at 10 min of mixing), the final yield point of the fluid is significantly lower than if an equivalent amount of HEC in liquid composition form is added. The difference is due to "fish eye" formation is the case of dry HEC addition. Equally important is the fact that when the liquid polymer composition is used under field conditions to make well drilling and treating fluids, there is no "fish eye" formation meaning that there is no necessity of screening the fluid before it can be used. Concomitantly, there is no danger of well damage caused by plugging of perforations or plating out of the "fish eyes" on the formation during open hole operations. Lastly, the ease of mixing the liquid polymer compositions as compared to mixing dry HEC means workover and other well treating fluids can be easily prepared at the well site without the need for sophisticated mixing equipment.

Results very similar to those seen in the Table and graphically demonstrated in the drawing were observed when the aqueous medium was a saturated sodium chloride solution. In particular, with previously viscosified brines, the final yield point using dry HEC is significantly lower than that observed using the liquid polymer composition of the present invention containing an equivalent amount of HEC.

The invention may be embodied in other specific forms without departing from the spirit or essential characteristics thereof. The present embodiments are therefore to be considered, in all respects as illustrative and not restrictive, the scope of the invention being indicated by the appended claims rather than by the foregoing description, and all changes which come within the meaning and range of equivalence of the claims are therefore intended to be embraced therein.

We claim:

1. A liquid, pourable, water dispersible polymer containing composition for thickening aqueous mediums comprising from about 25 to about 55% by weight, based on the total weight of said composition, of hydroxyethyl cellulose, from about 35 to 70% by weight, based on the total weight of said composition, of a liquid hydrocarbon selected from the class consisting of liquid aliphatic hydrocarbons, liquid aromatic hydrocarbons and mixtures thereof, from about 1.5 to about 8% by weight, based on the weight of said liquid hydrocarbon, of a methyl benzyl dialkyl ammonium bentonite gelling agent wherein the alkyl group contains from 14 to 22 carbon atoms and from about 1.5 to about 100% by weight, based on the weight of said gelling agent, of a dispersant selected from the class consisting of lower alcohols having from 1 to 6 carbon atoms, ketones having from 2 to 8 carbon atoms, mixtures of water and said alcohols, mixtures of water and said ketones and mixtures thereof.

2. The composition of claim 1 wherein said gelling agent comprises methyl benzyl dihydrogenated tallow ammonium bentonite.

3. The composition of claim 1 wherein said dispersant is selected from the class consisting of alcohols having from 1 to 6 carbon atoms, ketones having from 2 to 8 carbon atoms and mixtures thereof.

4. The composition of claim 1 wherein said dispersant comprises a mixture of methanol and water.

5. A well drilling or treating fluid comprising an aqueous medium and a liquid, polymer containing composition comprising from about 25 to about 55% by weight, based on the total weight of said composition, of hydroxyethyl cellulose, from about 35 to 70% by weight, based on the total weight of said composition, of a liquid hydrocarbon selected from the class consisting of liquid aliphatic hydrocarbons, liquid aromatic hydrocarbons and mixtures thereof, from about 1.5 to about 8% by weight, based on the weight of said liquid hydrocarbon, of a methyl benzyl dialkyl ammonium bentonite gelling agent wherein the alkyl group contains from 14 to 22 carbon atoms and from about 1.5 to about 100% by weight, based on the weight of said gelling agent, of a dispersant selected from the class consisting of lower alcohols having from 1 to 6 carbon atoms, ketones having from 2 to 8 carbon atoms, mixtures of water and said alcohols, mixtures of water and said ketones and mixtures thereof, the combined amount of aqueous medium and polymer containing composition being such that said fluid contains from about 0.1 to about 2 pounds per barrel of hydroxyethyl cellulose.

6. The fluid of claim 5 wherein said aqueous medium comprises a solution of a water soluble salt of an alkali metal, an alkaline earth metal, a Group 1B metal, a Group IIB metal, ammonium ion and mixtures thereof.

* * * * *